United States Patent
Langer (10) Patent No.: US 6,401,527 B1
(45) Date of Patent: Jun. 11, 2002

(54) METHOD FOR DETERMINING THE TORQUE DEVELOPED BY AN INTERNAL COMBUSTION ENGINE

(75) Inventor: Winfried Langer, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/650,739

(22) Filed: Aug. 30, 2000

(30) Foreign Application Priority Data

Aug. 30, 1999 (DE) .......................................... 199 41 171

(51) Int. Cl.$^7$ ............................................. G01M 15/00
(52) U.S. Cl. ..................................................... 73/117.3
(58) Field of Search ............................... 701/101–105, 701/110–111; 340/438; 73/117.3, 116

(56) References Cited

U.S. PATENT DOCUMENTS

| 4,501,138 A | 2/1985 | McCandless |
| 5,546,793 A | 8/1996 | Gimmler et al. |
| 5,771,482 A | 6/1998 | Rizzoni |
| 6,234,010 B1 * | 5/2001 | Zavarehi et al. .............. 73/116 |

FOREIGN PATENT DOCUMENTS

EP  0799983  10/1997

* cited by examiner

Primary Examiner—Benjamin R. Fuller
Assistant Examiner—Maurice Stevens
(74) Attorney, Agent, or Firm—Walter Ottesen (57) ABSTRACT

The invention is directed to a method for determining the actual torque ($M\_act$) developed by an internal combustion engine by evaluating the trace of the rpm (n) of the crankshaft of the engine. The method is simple, operates rapidly and requires especially little computation power. An index (A) for the actual torque ($M\_act$) can be determined from the rpm (n) in different ways. The actual torque ($M\_act$), which is developed by the engine, is determined from the index (A). The index (A) can be determined in a work stroke of a cylinder of the engine from: (a) the difference of the areas (F1, F2) between the trace of the rpm (n) and the mean rpm ($n\_$) or from the ratio of the areas (F1, F2); (b) the difference or the ratio of the extremes (E1, E2) of the maximum or minimum rpms (n) to each other; and (c) the difference or the ratio of the extremes (E1, E2) and the mean rpm ($n\_$).

16 Claims, 3 Drawing Sheets

METHOD FOR DETERMINING THE TORQUE DEVELOPED BY AN INTERNAL COMBUSTION ENGINE

FIELD OF THE INVENTION

The invention relates to a method for determining the actual torque developed by an internal combustion engine by evaluating the trace of the rotational speed (rpm) of the crankshaft of the engine.

BACKGROUND OF THE INVENTION

It is known to provide a transducer disc or a transducer wheel having markings on the crankshaft of an internal combustion engine for detecting the position of the crankshaft. The transducer disc or transducer wheel is scanned by a fixed pickup. The transducer wheel is configured, for example, as a transducer toothed wheel having teeth as markings on the periphery of the transducer wheel. The pickup is configured, for example, as an inductive pickup wherein voltage pulses are induced by the teeth which run past with a rotation of the crankshaft and of the transducer toothed wheel. The time-dependent spacings of the voltage pulses or of the teeth of the transducer toothed wheel (the so-called tooth times) are measured. From the measured tooth times, the trace of the rpm of the crankshaft is then determined. In a subsequent evaluation step, the trace of the actual torque, which is developed by the engine, is determined from the trace of the rpm.

The actual torque of the engine is transmitted to a central control unit of the engine for optimizing the power characteristic, the noise performance and the exhaust gas performance of the engine. In conventional internal combustion engines having intake manifold injection, the air charge of the cylinders of the engine is measured for determining the actual torque developed by the engine. The actual torque can, however, be determined only in conventional engines which are operated with lambda=1 (wherein the air/fuel mixture is in the ratio of 1:1). In internal combustion engines of newer types and especially for so-called lean engines and stratified charge engines (direct injecting internal combustion engines; gasoline or diesel engines), which are operated up to lambda=10 (air/fuel mixture in the ratio of 10:1), the air charge of the cylinders remains constant and only the fuel quantity, which is injected into the cylinders, is varied. Therefore, the actual torque of the engine cannot be determined for the air charge of the cylinder in engines of the newer type. For this reason, the actual torque is determined, for example, from the rpm of the crankshaft of the engine.

SUMMARY OF THE INVENTION

It is an object of the invention to provide a method of the above-mentioned kind which is so configured and improved that it operates simply and quickly and especially requires little computing power.

The method of the invention is for determining the actual torque (M_act) developed by an internal combustion engine by evaluating the trace of the rpm (n) of the crankshaft of the engine. The method includes the steps: determining the mean rpm (n_) from a trace of the rpm (n) in a work stroke of a piston of the engine; determining a first area (F1) between the trace of the rpm (n) in the first half of the work stroke and the mean rpm ($n_{13}$); determining a second area (F2) between the trace of the rpm (n) in the second half of the work stroke and the mean rpm ($n_{13}$); determining an index (A) for the actual torque (M_act) from one of: the difference of the first area (F1) and the second area (F2) or from the ratio of the first area (F1) to the second area (F2); and, determining the actual torque (M_act) developed by the engine from the index (A) for the actual torque (M_act).

In the method according to the invention, preferably an inductive rpm transducer is utilized. The rpm transducer includes, on the one hand, a transducer toothed wheel, which is assigned to the crankshaft of the engine, and, on the other hand, a fixed inductive pickup. Voltage pulses are induced in the pickup by the teeth which run by during a rotation of the crankshaft and of the transducer toothed wheel. The time-dependent intervals of the voltage pulses (that is, the teeth of the transducer toothed wheel), the so-called tooth times, are measured. The trace of the rpm of the crankshaft is then determined from the tooth times and the total number of teeth of the transducer toothed wheel. The trace of the rpm is plotted against the teeth of the transducer toothed wheel.

In the method of the invention, the rotational irregularity of the crankshaft is determined from the areas between the rpm trace and a mean rpm and is applied to determine the actual torque developed by the engine. In this way, an index for the actual torque can be determined in a simple manner and without a great complexity as to computations. This index is then converted into the actual torque developed by the engine. The actual torque can be determined with high accuracy from the area between the rpm trace and the mean rpm.

Each of the cylinders of the engine executes a work stroke during a two-time rotation of the crankshaft. Accordingly, the number of the teeth of the transducer toothed wheel included in a work stroke of a cylinder results from the quotient of the two-fold tooth number of the transducer toothed wheel and the number of the cylinders of the engine. When utilizing a 60-2 toothed wheel in a twelve cylinder engine, the result is that the work stroke of a cylinder includes ten teeth (2*60 teeth/12 cylinders=10). A 60-2 toothed wheel has 60 teeth on its periphery and two teeth thereof are only imaginary, that is, they are not actually configured and define gaps.

In the method of the invention, the difference (that is, the ratio of the first and the second areas in the first and second halves of the work strokes) are applied as characteristic variable. In the above-mentioned example, the first half of the work stroke therefore corresponds to five teeth of the transducer toothed wheel and the second half of the work stroke corresponds to the next five teeth. Starting from the first tooth of the transducer toothed wheel, the first half of the work stroke includes therefore the teeth 1 to 5 and the second half of the work stroke includes the teeth 6 to 10. Starting from any desired tooth of the transducer toothed wheel, the work stroke can include any desired ten teeth. The first area and the second area can include a desired interval within the five teeth of the transducer toothed wheel. However, it is important that, in the determination of the index of the actual torque, for all work strokes, the same intervals are applied for the first area and the second area.

According to a preferred embodiment of the invention, it is suggested that the first area include the entire area between the trace of the rpm in the first half of the work stroke and the mean rpm. The first area is therefore determined in the complete interval of half the work stroke. In the above example, the interval, in which the first area is determined, includes all five teeth of the first half of the work stroke.

According to another preferred embodiment of the invention, it is proposed that the first area includes the area between the trace of the rpm in the first half of the work stroke and the mean rpm within one interval. The interval can have any desired magnitude within the particular half of the work stroke.

Likewise, and in accordance with another preferred embodiment of the invention, it is proposed that the second area include the total area between the trace of the rpm in the second half of the work stroke and the mean rpm.

Likewise, it is suggested in accordance with another preferred embodiment of the invention that the second area include the area between the trace of the rpm in the second half of the work stroke and the mean rpm within an interval.

The second embodiment of the method of the invention includes the steps of: determining a first extreme (E1) of the maximum rpm (n) in a work stroke of a cylinder of the engine; determining a second extreme (E2) of the minimum rpm (n) in a work stroke; determining an index (A) for the actual torque (M_act) from one of the difference of the first extreme (E1) and the second extreme (E2) or the ratio of the first extreme (E1) and the second extreme (E2); and, determining the actual torque (M_act) developed by the engine from the index (A) for the actual torque (M_act).

The third embodiment of the method of the invention includes the steps of: determining the mean rpm ($n_{13}$) from the trace of the rpm (n) in a work stroke of a cylinder of the engine; determining a first extreme (E1) of the maximum rpm (n) in the work stroke; determining a second extreme (E2) of the minimum rpm (n) in the work stroke; determining an index (A) for the actual torque (M_act) from one of the difference of the first and second extremes (E1, E2) and the mean rpm (n_) or from the ratio of the first and second extremes (E1, E2) to the mean rpm (n_); and, determining the actual torque (M_act) developed by the engine from the index (A) for the actual torque (M_act).

According to these two solutions, it is not areas of the rpm traces but the extremes of the rpm traces in a work stroke which are applied for determining the actual torque of an engine. The extremes of the rpm trace permit a rapid and precise determination of the actual torque in a simple manner.

According to a further preferred embodiment of the invention, it is proposed that the trace of the rpm is corrected with respect to known influence quantities (especially with respect to oscillating masses) before the evaluation of the rpm.

According to an advantageous embodiment of the invention, it is proposed that the actual torque, which is developed by the engine, is determined from the product of the index for the actual torque and an rpm-dependent characteristic line summed with an rpm-dependent offset value. The actual value thereby results from the equation:

$$M\_act = A * k\_p(n) + \text{offset}(n) \qquad (1)$$

wherein: M_act is the actual torque, A is the index for the actual torque and k_p(n) is an rpm-dependent characteristic line.

Advantageously, the rpm-dependent characteristic line is determined before the actual determination of the actual torque, which is developed by the engine, from the quotient of an actual torque and the determined index for the actual torque at different rpms with an internal combustion engine which exhibits the smallest possible tolerances. The actual torque is the torque actually outputted by the engine. By solving a linear equation system passing through two measurement points at each rpm, the rpm-dependent characteristic line thereby results from the equation:

$$k\_p(n) = (M - \text{offset}(n))/A \qquad (2)$$

wherein: k_p(n) is the rpm-dependent characteristic line, M is the actual torque outputted by the engine and A is the determined index for the actual torque developed by the engine. Accordingly, an engine is operated actually or simulatively at different rpms. The actual torque, which is outputted by the engine, is measured and divided by the determined index for the actual torque. As a result of this division, one obtains the characteristic line, which is dependent upon that rpm at which the engine is just then operated.

The rpm-dependent characteristic line is determined in advance of carrying out the method to determine the actual torque developed by the engine and is stored in a suitable manner. Access can be made to the stored characteristic line during the determination of the actual torque. The determination of the rpm-dependent characteristic line must take place for each type of engine. The determined characteristic line can then be used for all engines of this type.

It is conceivable to obtain the rpm-dependent characteristic line and the rpm-dependent offset value by simulation. Preferably, the rpm-dependent characteristic line and/or the rpm-dependent offset value are, however, determined empirically on an engine test stand. On the one hand, on an engine test stand, a realistic and practical measurement result can be obtained in which also such factors are considered which do not usually flow into a simulation. On the other hand, on a test stand, the disturbance factors, which operate on an engine, especially tolerances, can be reduced or their effect on the measurement result can be compensated.

According to another advantageous embodiment of the invention, the tolerances of the engine also flow into the determination of the actual torque developed by the engine. It is proposed that the actual torque, which is developed by the engine, is determined from the sum of the index for the actual torque and a tolerance-dependent compensation value divided by the rpm multiplied by the rpm-dependent characteristic line and finally summed with the rpm-dependent offset value. In this way, the actual torque results from the equation:

$$M\_act = k\_p(n) * (Y\_T/n + A) + \text{offset}(n) \qquad (3)$$

wherein M_act is the actual torque, A is the index for the actual torque, k_p(n) is the rpm-dependent characteristic line, Y_T is the tolerance-dependent compensation value and (n) is the rpm of the crankshaft.

The tolerance-dependent compensation value is advantageously determined from the lowpass filtered difference of actual torque and desired torque multiplied by the rpm and divided by the rpm-dependent characteristic line. The tolerance-dependent compensation value then results from the equation:

$$Y\_T = \text{Lowpass}\{(M\_act - M\_des) * n / k\_p(n)\} \qquad (4)$$

wherein: M_act is the actual torque, M_des is the desired torque, (n) is the rpm of the crankshaft and k_p(n) is the rpm-dependent characteristic line. For the actual torque in the equation, either the actual torque from equation (1) or from equation (3) can be used or a corrected actual torque according to equation (5). The tolerance-dependent compensation value must be determined for each individual engine. This can either take place after manufacture of the engine (installation of the control of the engine) or in advance of each taking-into-service of the engine (calibration of the control of the engine) or at an inspection of the engine in a defined operating point.

According to a preferred embodiment of the invention, it is proposed that the tolerance-dependent compensation value be determined during the operation of the engine. In this way, the control of the engine can be continuously adapted to an input signal, which changes slowly, that is, the index for the actual torque and the output signal (that is, the actual torque M_act which is developed by the engine) can be correspondingly corrected.

The tolerance-dependent compensation value is adapted in specific operating ranges with a large time constant. The compensation value is lowpass filtered for this purpose. Because of the large time constant, rapid changes of the input signal do not flow or flow only in a very slight amount into the computation of the compensation value. The slow changes of the input signal especially flow into the computation of the compensation value. Such slow changes of the input signal are caused by: tolerances of the engine, deterioration (lower compression, lower friction) or in temperature deformations of the engine.

Advantageously, the tolerance-dependent compensation value is determined at a high rpm. At high rpms, which lie in the upper rpm range of the engine, the tolerances of the teeth (for example, dimensions of the teeth, pitches of tooth flanks) of the transducer toothed wheel, which is attached to the crankshaft, can be especially well corrected. The times of the change of the input signal are very low because of the toothed tolerances at high rpms. For this reason, the signals have little or no influence on the tolerance-dependent compensation value because of the lowpass filtering.

The rpm-dependent characteristic line was determined at a specific air/fuel mixture charge in a cylinder. For determining the actual torque for a lean engine, the rpm-dependent characteristic line is preferably corrected to the air/fuel mixture charge=0. For this purpose, it is proposed in accordance with another preferred embodiment of the invention that the rpm-dependent characteristic line and the rpm-dependent offset value be determined with a constant throttling of the engine and that the determined actual torque is corrected by the difference to the actual throttling multiplied by a proportionality factor. The equation for determining the corrected actual torque with an rpm-dependent characteristic line corrected to the air/fuel mixture=0 is as follows:

$$M\_act'=k\_p(n)*(A+Y\_T/n)+\text{offset }(n)-y\_p*p \qquad (5)$$

wherein M_act' is the corrected actual torque, A is the index for the actual torque, (n) is the rpm of the crankshaft, k_p(n) is the rpm-dependent characteristic line, y_p is a proportionality factor and (p) is the air/fuel mixture in the cylinder. The proportionality factor is determined at an operating point with defined rpm and torque and from at least two different air/fuel mixtures in the cylinder in a lean engine. The air/fuel mixture in the cylinder is, for example, measured by an intake manifold pressure sensor.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
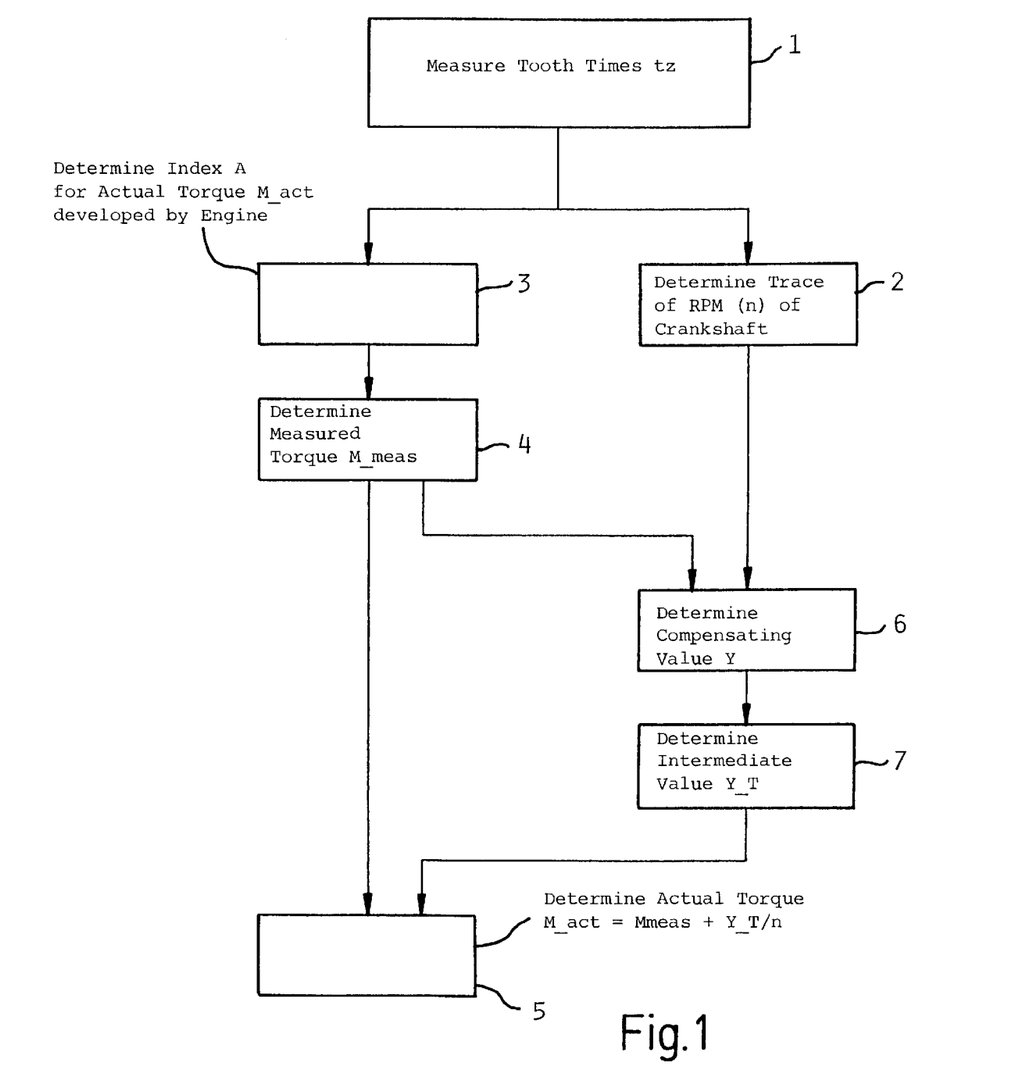
FIG. 1 is a sequence diagram showing a preferred embodiment of the method of the invention.

The method shown in the sequence diagram of FIG. 1 serves to determine the actual torque M act, which is developed by the engine, by evaluating the trace of the rpm (n) of the crankshaft of the engine.

A transducer wheel with markings is provided on the crankshaft to detect the rpm (n) of the crankshaft of the engine. In the present embodiment, the transducer wheel is configured as a transducer toothed wheel and the markings are configured as teeth on the periphery of the transducer toothed wheel. The teeth are scanned by a fixed inductive pickup. However, it is also conceivable to scan the teeth in another manner. Voltage pulses are induced in the pickup by the teeth which run past the pickup during a rotation of the crankshaft and transducer toothed wheel.

The time-dependent intervals of the voltage pulses (that is, the teeth of the transducer toothed wheel) are measured. These intervals are the so-called tooth times tz (see block 1 in FIG. 1). The trace of the rpm (n) of the crankshaft is determined in block 2 from the reciprocal value of the product of the total number of the teeth z of the transducer toothed wheel and the measured tooth times tz. Accordingly, in block 2, the trace of the rpm (n) is determined sequentially for all tooth times tz from the equation:

$$n=1/Z*tz) \qquad (6)$$

In block 3, an index A for the actual torque M_act, which is generated by the engine, is determined from the trace of the rpm (n). In lieu of first determining the rpm (n) from the tooth times tz, the index A can be also determined directly from the trace of the tooth times tz. For the embodiments which follow, it is, however, assumed that the index A is determined from the rpm (n).

Figure 2:
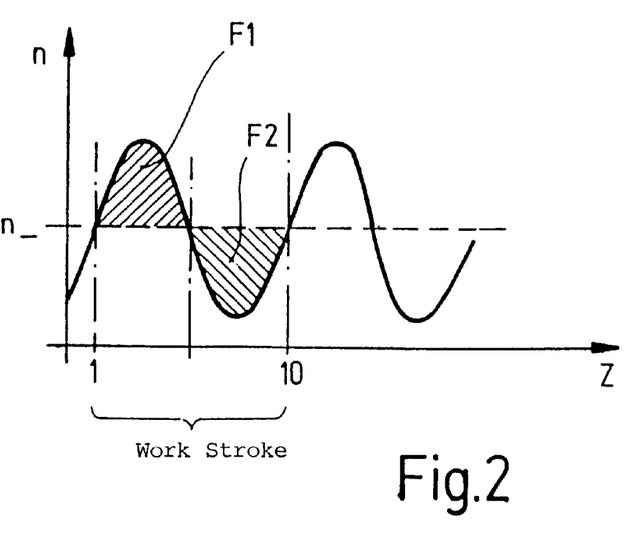
FIG. 2 shows the trace of the rpm in a work stroke of a cylinder of the internal combustion engine.
Figure 3:
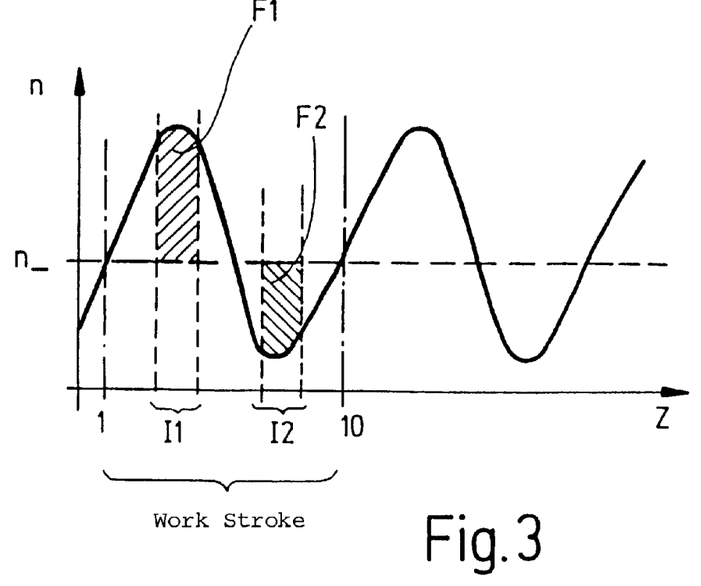
FIG. 3 is the trace of the rpm in a work stroke of a cylinder of the engine; and, FIG. 4 is the trace of the rpm in a work stroke of a cylinder of the engine.
Figure 4:
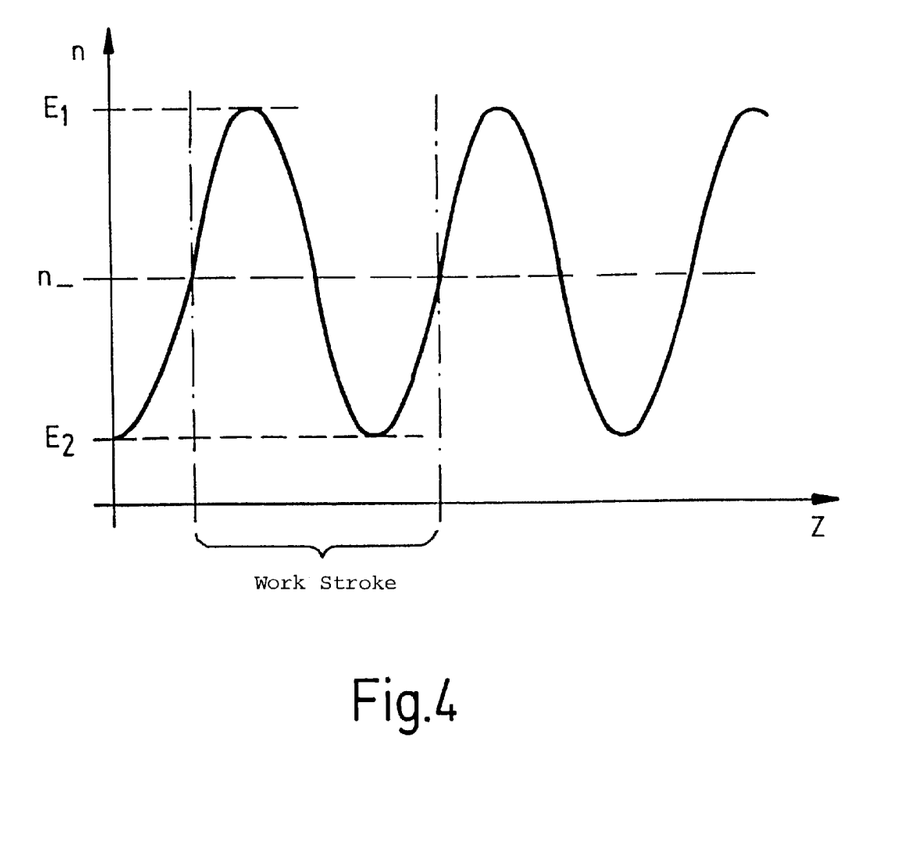

According to the invention, different methods are provided in order to determine the index A from the rpm (n). First, the trace of the rpm (n) is plotted against the teeth (z) of the transducer toothed wheel (solid line in FIGS. 2, 3 and 4). The mean rpm n_ (shown by broken line in FIGS. 2, 3 and 4) is determined from the trace of the rpm (n) in a work stroke of a cylinder of the engine. During a two-fold rotation of the crankshaft, each of the cylinders executes a work stroke. From this, the number of the teeth z_stroke of the transducer toothed wheel, which corresponds to a work stroke of the cylinder, results from the equation:

$$z\_stroke=2*Z/cyl \qquad (7)$$

wherein: Z is the total number of the teeth of the transducer wheel.

When using a 60-2 toothed wheel (which has 60 teeth on its periphery), the result is obtained for a 12-cylinder engine that the work stroke of a cylinder includes 10 teeth z_stroke (2*60 teeth/12 cylinders=10). In the 60-2 toothed wheel, two teeth are only imaginary, that is, two teeth are actually not formed and define a gap.

Within the work stroke, the rpm (n) has approximately a sine-shaped trace with a part of the trace being above the mean rpm n_ and a part of the trace being below the mean rpm n_. The sinusoidally-shaped trace of the rpm results because, during the compression phases of the cylinder of the engine, an rpm reducing force and, during the expansion phases, an rpm promoting force acts via the cylinder pistons on the crankshaft.

According to a first method to determine the index A for the actual torque M_act (see FIGS. 2 and 3), a first area F1 is determined between the trace of the rpm (n) in the first half of the work stroke and the mean rpm n__. Likewise, a second area F2 is determined between the trace of the rpm (n) in the second half of the work stroke and the mean rpm n__. In the present embodiment, the first half of the work stroke corresponds to the teeth 1 to 5 and the second half of the work stroke corresponds to the teeth 6 to 10.

The first area F1 and the second area F2 can be delimited within the particular halves of the work strokes by a desired interval. In FIG. 2, the area F1 and the area F2 include the entire area between the trace of the rpm (n) in the first half of the work stroke and the second half of the work stroke, respectively, and the mean rpm n__. In contrast, in FIG. 3, the area F1 includes an area between the trace of the rpm (n) in the first half of the work stroke and the mean rpm n__ in an interval I1 and the area F2 includes an area between the trace of the rpm (n) in the second half of the work stroke and the mean rpm n__ in an interval I2. The intervals (I1, I2) can have any desired magnitude within the respective halves of the work stroke. What is important, however, is that for all work strokes intervals I1 and I2 having the same magnitude are applied for the determination of the index A of the actual torque M__act.

The index A for the actual torque M__act is determined from the difference of the first area F1 and the second area F2 or from the ratio of the first area F1 to the second area F2. The difference or the ratio of the two areas (F1, F2) is a characteristic quantity for the index A for the actual torque M__act developed by the engine.

According to another method for determining the index A for the actual torque M__act (see FIG. 4), a first extreme E1 of the maximum rpm (n) and a second extreme E2 of the minimum rpm (n) is determined in the work stroke of a cylinder of the engine. Then, the index A for the actual torque M act can be determined from the difference of the first extreme E1 and the second extreme E2 or from the ratio of the first extreme E1 to the second extreme E2.

According to a further method for determining the index A for the actual torque M__act (see FIG. 4), an index A for the actual torque M__act is determined from the difference of the extremes (E1, E2) and of the mean rpm n__ or from the ratio of one of the extremes (E1, E2) to the mean rpm n__.

In the next blocks 4 to 7, the actual torque M__act, which is developed by the engine, is determined from the index A for the actual torque M__act. In block 4, the measured torque M__meas is first determined from the product of the index A and an rpm-dependent characteristic line k__p(n) according to the equation:

$$M\_\text{meas} = A * k\_p(n) + \text{offset}(n) \tag{8}$$

The rpm-dependent characteristic line k__p(n) is empirically determined and stored in advance of the determination of the actual torque M__act from the equation:

$$k\_p(n) = (M - \text{offset}(n))/A \tag{9}$$

with an engine which has the lowest possible tolerances. The internal combustion engine is preferably operated on an engine test stand with a specific actual torque M, which is developed by the engine, and at different rpms (n). During the determination of the actual torque M__act, access can be made to the stored characteristic line k__p(n). The determination of the rpm-dependent characteristic line k__p(n) must take place for each type of engine. The determined characteristic line k__p(n) can then be used for all engines of this type.

The rpm-dependent characteristic line k__p(n) was determined for a specific air/fuel mixture in a cylinder. The rpm-dependent characteristic line k__p(n) is corrected to the air/fuel mixture charge=0 for determining the actual torque M__act for lean engines. The equation for determining the corrected actual torque M__act' with an rpm-dependent characteristic line k__p(n) corrected to the air/fuel mixture=0 is:

$$M\_\text{act}' = k\_p(n) * (A + Y\_T/n) + \text{offset}(n) - y\_p * p \tag{10}$$

wherein: M__act' is the corrected actual torque, A is the index for the actual torque, (n) is the rpm of the crankshaft, k__p(n) is the rpm-dependent characteristic line, y__p is a proportionality factor and p is the air/fuel mixture in the cylinder. The air/fuel mixture p in the cylinder is measured, for example, via an intake manifold pressure sensor. The proportionality factor y__p is determined in an operating point with a defined rpm (n) and a torque M and from at least two different air/fuel mixtures (p1, p2) in the cylinder for lean engines.

$$y\_p \ (A1-A2)/(p1-p2) \tag{11}$$

The rpm-dependent characteristic line k__p(n) and the rpm-dependent offset "offset(n)" are corrected in that $$A = k\_p(n) + \text{offset}(n)$$

is replaced by:

$$A' = A - y\_p * p.$$

In the present embodiment, the measured torque M__meas defines an intermediate value on the path to the determination of the actual torque M__act which is developed by the engine. The measured torque M__meas is, however, already so precise that it can be outputted as the actual torque M__act which is developed by the engine (M__act=M__meas). In the present embodiment, the measured torque M__meas is first subjected to a correction of the deviations because of tolerances of the engine before it is outputted as the actual torque M__act. This correction is not required in the event the characteristic lines were applied to the present engine.

To correct the deviations based on tolerances of the engine, the actual torque M__act, which is developed by the engine, is determined in block 5 in accordance with the equation:

$$M\_\text{act} = M\_\text{meas} + Y\_T/n \tag{12}$$

wherein: Y__T is a tolerance-dependent compensation value.

The tolerance-dependent compensation value Y__T is determined in block 6 from the equation:

$$Y = (M\_\text{act} - M\_\text{des}) * n/k\_p(n) \tag{13}$$

and, in block 7, the compensation value Y__T is determined from a lowpass filtering of the intermediate value Y from the equation:

$$Y\_T = \text{Lowpass} \ (Y) \tag{14}$$

wherein M__des is the desired torque of the engine. The tolerance-dependent compensation value Y__T must be determined for each individual engine. Preferably, this takes place during the operation of the engine. In this way, especially disturbance factors can be compensated which would lead to very slow changes of the input signal, that is, of the index A for the actual torque M__act.

The tolerance-dependent compensation value Y_T is adapted in specific operating regions of the engine with a large time constant. For this purpose, the intermediate value Y is lowpass filtered. Because of the lowpass filtering, rapid changes of the input signal (that is, rapid changes of the index A for the actual torque M_act) do not influence or only influence to a very slight extent the computation of the compensation value Y_T.

The tolerance-dependence compensation value Y_T is preferably determined at a high rpm (n). At high rpms (n), the tolerances of the teeth (for example, dimensions, pitches of the flanks) of the transducer toothed wheel can be especially well corrected. The times of the changes of the input signal because of the tooth tolerances are very low at high rpms (n). For this reason, they have no influence or only a very slight influence on the tolerance-dependent compensation value Y_T because of the lowpass filtering.

It is understood that the foregoing description is that of the preferred embodiments of the invention and that various changes and modifications may be made thereto without departing from the spirit and scope of the invention as defined in the appended claims.

What is claimed is:

1. A method for determining the actual torque (M_act) developed by an internal combustion engine by evaluating the trace of the rpm (n) of the crankshaft of the engine, the method comprising the steps:

determining the mean rpm (n_)from a trace of the rpm (n) in a work stroke of a piston of said engine;

determining a first area (F1) between the trace of said rpm (n) in the first half of said work stroke and said mean rpm (n_);

determining a second area (F2) between the trace of the rpm (n) in the second half of said work stroke and said mean rpm (n_);

determining an index (A) for said actual torque (M_act) from one of: the difference of said first area (F1) and said second area (F2) and or from the ratio of said first area (F1) to said second area (F2); and, determining said actual torque (M_act) developed by said engine from said index (A) for said actual torque (M_act).

2. The method of claim 1, wherein said first area (F1) includes the total area between the trace of said rpm (n) in said first half of said work stroke and the mean rpm (n_).

3. The method of claim 1, wherein said first area (F1) includes the area between the trace of said rpm (n) in the first half of said work stroke and the mean rpm (n_) in an interval (I1, I2).

4. The method of claim 1, wherein said second area (F2) includes the entire area between the trace of said rpm (n) in said second half of said work stroke and the mean rpm (n_).

5. The method of claim 1, wherein the second area (F2) includes the area between the trace of the rpm (n) in said second half of said work stroke and said mean rpm (n_) in a time interval (I1, I2).

6. A method for determining the actual torque (M_act) developed by an internal combustion engine by evaluating the trace of the rpm (n) of the crankshaft of the engine, the method comprising the steps of:

determining a first extreme (E1) of the maximum rpm (n) in a work stroke of a cylinder of said engine;

determining a second extreme (E2) of the minimum rpm (n) in a work stroke;

determining an index (A) for said actual torque (M_act) from one of the difference of said first extreme (E1) and said second extreme (E2) or the ratio of said first extreme (E1) and said second extreme (E2); and, determining the actual torque (M_act) developed by said engine from said index (A) for said actual torque (M_act).

7. A method for determining the actual torque (M_act) developed by an internal combustion engine by evaluating the trace of the rpm (n) of the crankshaft of the engine, the method comprising the steps of:

determining the mean rpm (n_) from the trace of the rpm (n) in a work stroke of a cylinder of said engine;

determining a first extreme (E1) of the maximum rpm (n) in said work stroke;

determining a second extreme (E2) of the minimum rpm (n) in said work stroke;

determining an index (A) for the actual torque (M_act) from one of the difference of said first and second extremes (E1, E2) and said mean rpm (n_) or from the ratio of said first and second extremes (E1, E2) to said mean rpm (n_); and, determining said actual torque (M_act) developed by said engine from said index (A) for the actual torque (M_act).

8. The method of claim 7, wherein the trace of said rpm (n) is corrected with respect to known influence quantities including with respect to oscillating masses before the evaluation of said rpm.

9. The method of claim 8, wherein the actual torque (M_act) developed by said engine is determined from the product of said index (A) and an rpm dependent characteristic line (k_p(n)) summed with an rpm dependent offset value (offset (n)) in accordance with the equation:

$$M\_act = A * K\_p(n) + \text{offset}(n).$$

10. The method of claim 7, wherein the rpm dependent characteristic line (k_p(n)) is determined in advance of carrying out the above method steps from the equation:

$$i\ k\_p(n) = (M - \text{offset}(n))/A$$

with an engine, which has tolerances as low as possible and at a specific actual torque (M) and at different rpms (n) in accordance with the equation:

$$k\_p(n) = (M - \text{offset}(n))/A.$$

11. The method of claim 10, wherein at least one of the following is determined empirically on a test stand: the rpm-dependent characteristic line (k_p(n) and the rpm-dependent offset value (offset (n)).

12. The method of claim 9, wherein the actual torque (M_act) developed by said engine is determined from the sum of said index (A) for the actual torque (M_act) and a tolerance-dependent compensating value (Y_T) divided by the rpm (n) multiplied by the rpm-dependent characteristic line (k_p(n)) and summed with the rpm-dependent offset value (offset (n)) in accordance with the equation:

$$M\_act\ k\_p(n) * (Y\_T/n + A) + \text{offset}(n).$$

13. The method of claim 12, wherein the tolerance-dependent compensating value (Y_T) is determined from the lowpass-filtered difference of the actual torque (M_act) and the desired torque (M_des) multiplied by the rpm (n) and divided by the rpm-dependent characteristic line (k_p(n)) in accordance with equation:

$$Y\_T = \text{Lowpass}\{(M\_act - M\_des) * n/k\_p(n)\}.$$

14. The method of claim 13, wherein said tolerance-dependent compensating value (Y_T) is determined at a high rpm (n).

15. The method of claim 13, wherein the tolerance-dependent compensating value (Y_T) is determined during the operation of said engine.

16. The method of claim 7, wherein said rpm-dependent characteristic line (k_p(n)) and said rpm-dependent offset value (offset (n)) is determined at constant throttling of said engine and the determined actual torque (M_act) is corrected by the difference to the actual throttling multiplied by a proportionality factor in accordance with the equation:

$$M\_act' = k\_p(n)*(A+Y\_T/n)+\text{offset}(n)-y\_p*p.$$

* * * * *

UNITED STATES PATENT AND TRADEMARK OFFICE
CERTIFICATE OF CORRECTION

PATENT NO. : 6,401,527 B1
DATED : June 11, 2002
INVENTOR(S) : Winfried Langer

It is certified that error appears in the above-identified patent and that said Letters Patent is hereby corrected as shown below:

<u>Column 9,</u>
Line 38, delete "or from".

<u>Column 10,</u>
Line 40, delete "i".
Line 59, delete "M_act k_p(n) * (Y_T/n+A)+offset(n)." and substitute -- M_act = k_p(n) * (Y_T/n+A)offset(n). -- therefor.

Signed and Sealed this

First Day of July, 2003

JAMES E. ROGAN
*Director of the United States Patent and Trademark Office*